United States Patent [19]
Babcock

[11] 3,960,785
[45] June 1, 1976

[54] COMPOSITION AND METHOD FOR INHIBITING CURING SHRINKAGE IN ORGANIC PLASTIC SYSTEMS

[75] Inventor: Henry Nash Babcock, Old Greenwich, Conn.

[73] Assignee: Construction Products Research, Inc., Old Greenwich, Conn.

[22] Filed: Mar. 13, 1972

[21] Appl. No.: 234,369

[52] U.S. Cl............. 260/2.5 R; 260/2.5 AE; 260/2.5 BD; 260/2.5 EP; 260/2.5 N; 260/37 EP; 260/37 N; 260/40 R; 260/42.14
[51] Int. Cl.$^2$............. C08K 7/24; C08J 9/30; C08J 9/00
[58] Field of Search........ 260/2.5 AE, 2.5 R, 37 EP, 260/DIG. 33, 2.5 BD

[56] References Cited
UNITED STATES PATENTS

| | | | |
|---|---|---|---|
| 2,518,454 | 8/1950 | Elliott | 260/2.5 R |
| 3,075,943 | 1/1963 | Burgert | 260/38 |
| 3,078,240 | 2/1963 | Hoshino et al. | 260/2.5 AE |
| 3,218,273 | 11/1965 | Montesano | 260/37 EP |
| 3,355,398 | 11/1967 | Kass | 260/2.5 AE |
| 3,386,946 | 6/1968 | Willis | 260/37 EP |

OTHER PUBLICATIONS

*Chemical Leaded Molecular Sieves,* Union Carbide Technical Bulletin July 1959, pp. 1–6.

*Primary Examiner*—Wilbert J. Briggs, Sr.
*Attorney, Agent, or Firm*—Alphonse R. Noe

[57] ABSTRACT

The shrinkage of organic plastics, such as polyepoxies and polyesters, can be controlled by incorporating therein an admixture of solid particulate gas carriers, such as fluid coke, activated alumina, activated bauxite, silica gel, and delayed coke.

22 Claims, No Drawings

COMPOSITION AND METHOD FOR INHIBITING CURING SHRINKAGE IN ORGANIC PLASTIC SYSTEMS

BACKGROUND OF THE INVENTION

1. Field of the Invention

This invention relates to organic plastics and, more particularly, to organic plastic systems containing an additive capable of reducing or eliminating the curing shrinkage.

2. Description of the Prior Art

Curing shrinkage in organic plastics, and particularly in exothermic plastics, is well known. For certain applications, such as in casting and molding, the shrinkage adversely affects the quality of the final product. In fact, the shrinkage effect is a constant problem for the plastic application engineers for precision casting and molding. To overcome the shrinkage, engineers have tried to mix various plastic materials with diversified shrinkage and expansion properties or to use elaborate precautions and adjustments to compensate the shrinkage so as to obtain a final cast that fits the specification. Mixing plastic materials to compensate shrinkage generally is achieved only at the sacrifice of other desirable properties. Adjustment of molds for the shrinkage generally fails to provide the precision and the desired surface properties in the resultant cast.

The use of various organic blowing agents to produce flexible and rigid plastic foams are also well known. The use of this type of agent for controlling shrinkage, however, is not desirable because blowing action is difficult to control and, more particularly, the resultant products usually have weakened structural properties and are not desirable for many applications.

SUMMARY OF THE INVENTION

I have discovered that certain well-known industrial adsorbent and certain cokes, when incorporated in the organic plastic material, instead of absorbing the fluidic plastic material to further emphasize the shrinkage, cause the expansion of the resultant plastic system to overcome the curing shrinkage effect. The exact mechanism of how the shrinkage is prevented by my novel additive is not yet certain. From the resultant cast it can be hypothesized that the additive, which has a highly porous structure, releases the entrapped gases therein during the curing stage, providing numerous minute bubbles, thus offsetting the shrinkage without essentially altering the essential physical properties of the resultant product.

I have not experimented with all the materials which have these essential properties to prevent shrinkage in organic plastics. However, I found the general industrial solid absorbent, such as activated alumina, activated bauxite, and silica gel, to be particularly suitable. Other materials which are not generally recognized as industrial solid adsorbent, such as fluid coke and delayed coke, but have a highly porous structure capable of releasing the entrapped gas in the fluidic plastic material, are equally suitable for the present invention.

Broadly stated, the present invention comprises an organic plastic composition comprising a fluidic organic plastic and an admixture comprising a gaseous carrier in the form of a solid particular material capable of releasing a volume of gas to cause expansion sufficient to compensate at least a major portion of the early shrinkage during the curing of said plastic composition.

The admixture of the solid gas carrier preferably is added to the fluidic plastic material just prior to the curing and setting of the same.

DESCRIPTION OF THE PREFERRED EMBODIMENTS

The preferred solid gas carrier for the present invention has a porous structure with open cells for entrapping the desired volume of gas, and is hard and generally is inert to the organic plastic systems. A particularly desirable class of materials are the well-known industrial solid adsorbent, such as activated alumina, activated bauxite, and silica gel. This type of material requires little or no treatment before it is used in the present invention. The other class of preferred gas carriers is coke from petroleum processes, particularly the fluid coke and delayed coke.

In general, the effective particulate solid gas carrier for eliminating the shrinkage of the organic plastic system should have a sufficiently large volume of releasable entrapped gas so that only relatively small amounts of this shrinkage-preventive additive have to be used to offset the contracted volume in a plastic system during curing stage. However, the amount of particulate material added to the organic system has no fixed limit. Large amounts of less effective additives may be used not only to offset the shrinkage, but also to use as filler for the plastic system when required.

As stated previously, the exact nature why certain particulate materials can be used effectively to eliminate the shrinkage in organic plastic systems is not completely understood. The release of gas is due probably to the common surface properties showed by this type of additive, which preferentially adsorb the fluidic plastic to cause the discharge of the gas initially entrapped in the material, either by a simple displacement action or by a combination of displacement and capillary actions due to the change of environment conditions during the curing stage of the organic plastic system. The discharged gas offsets the contraction within the plastic system.

Depending on the viscosity of the plastic material, I found it is possible to control the speed of gas release and the size of the gas bubbles by controlling the size and selecting the surface properties of the particulate materials. Generally, the particulate material with smaller cells will release smaller bubbles at a slower rate and conversely the material with larger cells will release larger bubbles at a faster rate. For a highly porous material, reduction of particle size will increase the number of open cells, hence improving the gas entrapping and releasing efficiency of the material for inhibiting the shrinkage of the plastic system. As will be apparent from the subsequent discussion, due to the differences in the surface properties and particle sizes, addition of one or a mixture of additives with a substantially uniform or a selected range of particle sizes will provide a controlled release of the entrapped gas over an extended period during the curing stage and early hardening of the plastic system for various purposes of inhibiting the shrinkage thereof.

In addition to the activated alumina, bauxite, and silica gel, the major types of industrial adsorbents that may be used in this invention include aluminosilicate, bone char, wood char, activated carbon, magnesia, and magnesium silicate. Some of these adsorbents require special treatment before they become suitable for controlling the shrinkage of the plastic system. The treatment, however, generally involves simply drying the additive to reduce the moisture content therein to below about 3 percent by weight. The aforesaid adsorbents are available commercially in a variety of grades and particle sizes and generally have low moisture content, so further treatment is not required. Although the size of these adsorbents is not critical, we prefer to use adsorbents with a majority of the particle below about 30 mesh and more preferably below about 50 mesh. Within the size range selected, these adsorbents will provide a sufficiently fast release rate so that a major portion of the entrapped gas will be released while the plastic system is still in a plastic state.

The amount of the admixture of this invention to be used depends on the shrinkage characteristics and the viscosities of the particular plastic system, also, to a large extent, the physical properties of the particular adsorbent in coke. In general, the adsorbent should have internal porosity in excess of 25 percent and an external void fraction above about 35 percent. The particulate material should be sufficiently small to provide a surface in excess of about 100 m$^2$/q.

In carrying out the method of this invention, the proper amount of additive may be added to the fluidic plastic material shortly before the addition of hardening or curing catalyst so that no excess gas from the additive is released prior to the curing action. In most exothermic plastic systems, the viscosity of the plastic material is relatively high before the addition of the hardener. The curing action causes the release of excess heat, which in turn lowers the viscosity of the fluid and causes higher displacement and faster release of gas bubbles.

In most plastic systems, such as polyepoxies and polyesters, the hardeners are low viscosity fluid. The additive preferably should not be mixed with the hardener to avoid excess release of gas. With solid catalytic curing systems, the additive may be advantageously mixed with the catalyst before adding to the plastic material.

While the major advantage of this invention is used to prevent shrinkage for resinous systems used for molding and casting, it is possible and sometimes highly desirable to use the invention to produce flexible or rigid forms wherein the additive provides additional properties, such as nonskid properties, not obtainable from conventional chemical blowing agents.

Further to illustrate this invention, specific examples are described herein below. It is understood while the examples used herein are limited to polyepoxies, polyesters, polyvinyl resins, and polyurethanes, other resinous systems can also be used and benefit from this invention.

EXAMPLE I

Expanding Epoxy Mortars

In this example, the performance of the plastic system mixed with the gas carrier was judged by the expansion and contraction of the resultant cast in a cylinder mold with approximately 10 percent of exposed surface as soon as the gas carrier and hardener were mixed with the plastic material.

The expansion and contraction of the cast was determined by the verticle movement of the top surface. For the purpose of higher accuracy, a light test was used to measure the movement of the top surface. The test consists of using a focused light beam to project a shadow of the top surface onto a screen equipped with a vertical graduation. The magnification is 72 times. The movement of the top surface on the screen is recorded every 10 to 20 minutes for each cast until final set, which usually takes about 3 to 4 hours.

In this example all the mixture contains sand as a filler. When a very light air-entrained epoxy structure is required, the sand filler may be required or substituted by the solid particulate gas carrier of the present invention. It is noted that the addition of the gas carrier serves not only as an agent preventing the shrinkage of the epoxy resin; it also serves as a filler.

In Table I, Seasorb is a trade name for magnesium oxide. Act. Carbon is short for activated carbon.

Table I

| Epoxy Compounds | | | | |
|---|---|---|---|---|
| Manufacture: Ceilcote | | | | |
| | (Template) A Grams | B Grams | C Grams | D Grams |
| Resin | 100 | 74.4 | 74.4 | 100 |
| Hardener | 7 | 5.6 | 5.6 | 8 |
| Sand Filler | 300 | 160 | 160 | 0 |
| Shrinkage-Correction Additive | 0 | 110 (Silica Gel) | 100 (Alumina) | 400 (Delayed Coke) |
| Light Test, 4" Sample at 72× Maximum Reading* | −3.0 | −0.2 | +0.3 | +0.3 |
| Manufacturer: R. H. Carlson | | | | |
| | (Template) E Grams | F Grams | G Grams | H Grams |
| Resin | 50 | 50 | 50 | 50 |
| Hardener | 50 | 50 | 50 | 50 |
| Sand Filler | 200 | 100 | 100 | 100 |
| Shrinkage-Correction Additive | 0 | 100 (Bauxite) | 100 (Seasorb) | 50 (Act. Carbon) |
| Light Test, 4" Sample at 72× Maximum Reading* | −15.5 | −7.0 | +5.3 | +18** |
| Manufacturer: Furane | | | | |
| | (Template) I | | J | K |

Table I-continued

Epoxy Compounds

Manufacture: Ceilcote

| | (Template) A Grams | B Grams | C Grams | D Grams |
|---|---|---|---|---|
| Resin | 9.89 | | 9.35 | 9.5 |
| Hardener | 2.97 | | 2.81 | 2.86 |
| Sand Filler | 87.14 | | 82.5 | 77.0 |
| Shrinkage-Correction Additive | 0 | | 5.5 (Fluid Coke) | 10.8 (Fluid Coke) |
| Light Test, 4" Sample at 72× Maximum Reading* | −2.1 | | +0.5 | +6.9 |

\* (+) Expansion
(−) Shrinkage
\*\*Expanded off chart.

EXAMPLE II

Castings of Polyester Resins

The results of 4-inch-high by 2-inch-diameter castings (similar to Example I) of various polyester resinous systems containing the additive fluid coke are tabulated in Table II. In the table it can be seen that compositions containing both fluid coke and water yield negligible shrinkage, while compositions without coke yielded the customary shrinkage.

Table II

| Runs | A | B | C |
|---|---|---|---|
| Ingredients: | | | |
| Resin (1) | 70 g | 70 g | 70 g |
| Water | 0 | 1.2 g | 2.4 g |
| Sand (2) | 292 g | 292 g | 350 g |
| Fluid Coke (3) | 58 g | 58 g | — |
| Growth, percentage (4) | −1.1 | −0.1 | −0.44 |

(1) Pettit's Boat Resin 9150 with 0.66 g Catalyst (MEK peroxide in DMP) per 100 grams resin.
(2) Flintshot
(3) Fluid Coke — oven-dried; cooled in loosely covered can.
(4) Growth means the change in height of the casting from the time when the resin-wet mixes were compacted until final cure, 20 to 22 hours later.

EXAMPLE III

Vinyl Thermoplastic Foam

Fluid coke was used to create a unicellular material when the following ingredients were stirred together as the temperature was raised to 350° to 400°F.

Table III

| | |
|---|---|
| "Vinylite" Resin — QYJV | 13.1 grams |
| Santicizer 160 | 13.1 |
| DiPhos | 0.4 |
| Fluid Coke | 3.4 |
| Density of cooled mass | 1.25g/cc |
| Reference 1RWG 59 | |
| Date: February 2, 1967 | |

The cooled mass is a soft, pliant foam having many closed cells and a gray color. It has nonskid properties.

EXAMPLE IV

Urethanes

Similarly, fluid coke was added to polyurethane. A rigid polyurethane foam was obtained.

Table IV

| Run | 39C | 41A |
|---|---|---|
| Polyol Mix (1) | 30.0g | 30g |
| Isocyanate Mix (1) | 19.2 | 19.2 |
| Coke (2) | none | 12 |
| Density of rigid foam p.c.f. | 5.25 | 4.72 |

(1) The polyol and isocyanate materials were received as samples for the preparation of low density, rigid foam from a major supplier of such materials (Hooker Chemical–Bulletin 1261E, April 1965).
(2) The coke was U.O.P. No. 2 Polymerization Catalyst, Lot 26 ORL, Drum 2248. It was used as received.

A second series was prepared using a second batch of experimental mix components received from Allied Chemical. The results are shown in Table V.

Table V

| Run | 1A | 1B |
|---|---|---|
| Polyol (2-242) | 16.3 | 16.3 |
| Polyisocyanate Nacconate 4040 | 11.4 | 10.8 |
| Coke | — | 10.0 |
| Density Rigid Foam p.c.f. | 4.57 | 2.98 |

Both of the above series were prepared by weighing the components into a polystyrene cup in the following order: coke, polyol, and isocyanate. Stirring with an electric-powered agitator effectively mixed the ingredients and allowed the reaction to commence.

In each series fluid coke seems to yield a less dense foam; the bubbles from the coke apparently are sufficient to more than compensate for the weight of the coke itself.

I claim:

1. A method for inhibiting curing shrinkage in an organic fluidic plastic system comprising selecting a porous particulate solid material gas carrier inert to the system having a volume of releasable entrapped gas within its pores, incorporating the particulate solid material in the fluidic plastic system and controllably releasing the gas entrapped within the particulate solid material during curing of the system, without essentially altering the essential properties of the system, in such manner as to cause expansion of the system sufficient to offset the shrinkage tendency of the organic plastic system, said gas release being achievable without the application of heat.

2. A method according to claim 1 wherein the gas carrier is fluid coke.

3. A method according to claim 2 wherein the fluid coke has a particle size predominantly finer than 100 mesh.

4. A method according to claim 2 wherein the fluid coke has an absolute moisture content of less than about 3 percent by weight.

5. A method according to claim 1 wherein the gas carrier is activated bauxite.

6. A method according to claim 1 wherein the gas carrier is activated alumina.

7. A method according to claim 1 wherein the gas carrier is silica gel.

8. A method according to claim 1 wherein the gas carrier is delayed coke having particle size predominantly finer than 100 mesh.

9. A method according to claim 8 wherein the delayed coke has an absolute moisture content below about 3 percent by weight.

10. A method according to claim 1 wherein the gas carrier is activated carbon.

11. A method according to claim 1 wherein the gas carrier is magnesium oxide.

12. An organic plastic composition comprising an organic fluidic plastic of the type having a tendency to undergo shrinkage upon curing and a porous particulate solid material gas carrier inert to the plastic, having a volume of entrapped gas within its pores and capable of controllably releasing the entrapped gas during the curing of the plastic without the application of heat and without essentially altering the essential properties of the plastic, in an amount effective to cause expansion sufficient to compensate at least a major portion of the shrinkage normally attendant curing and early hardening of the plastic.

13. An organic plastic composition according to claim 12 wherein the gas carrier is fluid coke.

14. An organic plastic composition according to claim 13 wherein the fluid coke has a particle size predominantly finer than 100 mesh.

15. An organic plastic composition according to claim 13 wherein the fluid coke has an absolute moisture content of less than about 3 percent by weight.

16. An organic plastic composition according to claim 12 wherein the gas carrier is activated alumina.

17. An organic plastic composition according to claim 12 wherein the gas carrier is activated bauxite.

18. An organic plastic composition according to claim 12 wherein the gas carrier is silica gel.

19. An organic plastic composition according to claim 12 wherein the gas carrier is delayed coke having a particle size predominantly finer than 100 mesh.

20. An organic plastic composition according to claim 19 wherein the delayed coke has an absolute moisture content below about 3 percent by weight.

21. An organic plastic composition according to claim 1 wherein the gas carrier is activated carbon.

22. An organic plastic composition according to claim 1 wherein the gas carrier is magnesium oxide.

* * * * *

UNITED STATES PATENT OFFICE
CERTIFICATE OF CORRECTION

PATENT NO. : 3,960,785
DATED : June 1, 1976
INVENTOR(S) : HENRY NASH BABCOCK

It is certified that error appears in the above-identified patent and that said Letters Patent are hereby corrected as shown below:

Title page, right column, line 7, "Leaded" should read --Loaded--.

Col. 1, lines 40, 56 and 59, "adsorbent" should read --adsorbents--;

line 66, "particular" should read --particulate--.

Col. 2, line 14, "adsorbent" should read --adsorbents--.

Col. 3, line 20, "in" should read --or--.

Col. 4, line 24, "verticle" should read --vertical--; line 35,

"required", second occurrence, should read --replaced--.

Col. 5, lines 3-8, the heading of "Table I - continued" erroneously repeats a wrong heading from the previous page, column 4. Delete the wrong heading:

| Epoxy Compounds | | | |
|---|---|---|---|
| Manufacturer: Ceilcote | | | |
| (Template) | | | |
| A | B | C | D |
| Grams | Grams | Grams | Grams |

Signed and Sealed this

Twenty-fourth Day of August 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,960,785
DATED : June 1, 1976
INVENTOR(S) : HENRY NASH BABCOCK

It is certified that error appears in the above-identified patent and that said Letters Patent are hereby corrected as shown below:

Col. 1, line 31, "are" should read --is--.
Col. 2, line 3, "admixture of the" should be deleted;
line 40, "environment" should read --environmental--.
Col. 3, line 4, "therein" should read --thereof--;
line 15, "state" should read --stage--;
line 24, "q" should read --g--.
Col. 4, line 1, "used" should be deleted;
line 5, "forms" should read --foams--;
line 29, "is 72 times" should read --varies--;
line 34, "all the mixture" should read --some mixtures--;
lines 43-68, in Table I each of the two occurrences in that portion of the table in column 4 of "Sample at 72X" should be changed as follows:
line 54, "Sample at 72X" should read across the four data columns:
--Sample at:     88X     88X     88X     120X--
line 64, "Sample at 72X" should read across the first three data columns:
--Sample at:     88X     88X     88X     --.
Col. 5, lines 30-31, ", while compositions without coke yielded the customary shrinkage" should be deleted.

Signed and Sealed this

Twenty-sixth Day of October 1976

[SEAL]

Attest:

RUTH C. MASON
*Attesting Officer*

C. MARSHALL DANN
*Commissioner of Patents and Trademarks*